United States Patent [19]

Durand et al.

[11] Patent Number: 5,077,358

[45] Date of Patent: Dec. 31, 1991

[54] PROCESS FOR THE START UP OF POLYMERIZATION OR COPOLYMERIZATION IN THE GAS PHASE OF ALPHA-OLEFINS IN THE PRESENCE OF A ZIEGLER-NATTA CATALYST SYSTEM

[75] Inventors: Daniel C. Durand, London, England; Frederic R. M. M. Morterol, Sausset-les-Pins; Stylianos Sandis, Lavera, both of France

[73] Assignee: BP Chemicals Limited, London, England

[21] Appl. No.: 685,965

[22] Filed: Apr. 12, 1991

Related U.S. Application Data

[63] Continuation of Ser. No. 399,346, Aug. 28, 1989, abandoned, which is a continuation of Ser. No. 185,253, Apr. 19, 1988, abandoned, which is a continuation of Ser. No. 77,026, Jul. 22, 1987, abandoned, which is a continuation of Ser. No. 789,476, Oct. 21, 1985, abandoned.

[30] Foreign Application Priority Data

Oct. 24, 1984 [FR] France ................................ 8416466

[51] Int. Cl.$^5$ .......................... C08F 2/34; C08F 10/00
[52] U.S. Cl. ..................................... 526/125; 526/88; 526/129; 526/348; 526/348.4; 526/348.6; 526/351; 526/352; 526/901; 526/904
[58] Field of Search .................................. 526/88, 125

[56] References Cited

U.S. PATENT DOCUMENTS

| | | | |
|---|---|---|---|
| 4,003,712 | 1/1977 | Milla | 526/88 |
| 4,035,560 | 7/1977 | Caumartin et al. | 526/901 |
| 4,166,167 | 8/1979 | Bye et al. | 526/901 |
| 4,427,573 | 1/1984 | Miles et al. | 526/125 |
| 4,467,080 | 8/1984 | Brun et al. | 526/88 |
| 4,564,660 | 1/1986 | Williams et al. | 526/77 |
| 4,721,763 | 1/1988 | Bailly et al. | 526/88 |

FOREIGN PATENT DOCUMENTS

| | | |
|---|---|---|
| 99660 | 2/1984 | European Pat. Off. . |
| 1082038 | 9/1967 | United Kingdom . |

*Primary Examiner*—Edward J. Smith
*Attorney, Agent, or Firm*—Brooks Haidt Haffner & Delahunty

[57] ABSTRACT

The present invention relates to a process for the start up of polymerization or copolymerization in the gas phase by bringing the said alpha-olefins in contact under polymerization or copolymerization conditions in a fluidized bed and/or with mechanical stirring with a charge powder, in the presence of a catalyst system of the Ziegler-Natta type, this process being characterized in that the charge powder used is previously dehydrated and subjected to a treatment by bringing the said charge powder into contact with an organoaluminum compound for a period of at least five minutes, so that the polymerization or copolymerization starts up immediately after the contracting of the alpha-olefins with the charge powder in the presence of the catalyst system.

13 Claims, No Drawings

PROCESS FOR THE START UP OF POLYMERIZATION OR COPOLYMERIZATION IN THE GAS PHASE OF ALPHA-OLEFINS IN THE PRESENCE OF A ZIEGLER-NATTA CATALYST SYSTEM

This application is a continuation, of application Ser. No. 07/399,346, filed Aug. 28, 1989, now abandoned, which is a continuation, of application Ser. No. 07/185,253, filed Apr. 19, 1988, now abandoned, which is a continuation, of application Ser. No. 07/077,026, filed Jul. 22, 1987 now abandoned, which is a continuation of application Ser. No. 06/789,476, filed Oct. 21, 1985 now abandoned.

The present invention relates to a process for the start up of polymerisation or copolymerisation in the gas phase of alpha-olefins in the presence of a catalyst system of the Ziegler-Natta type.

It is known that catalyst systems for the polymerisation or copolymerisation of alpha-olefins, known as Zielger-Natta systems, are obtained by the association, on the one hand, of a catalyst consisting of a compound of a transition metal belonging to groups IV, V and VI of the Periodic Table of Elements, and on the other hand of a co-catalyst consisting of an organometallic compound of a metal of groups I to III of this Table. The compounds most used as catalysts are the halogenated derivatives of titanium, and as co-catalysts alkylaluminium or alkylaluminium chloride.

Polymerising alpha-olefins in the gas phase by bringing them into contact with the catalyst system in an apparatus comprising, for example, a reactor with a fluidised bed and/or with mechanical stirring is known. In the special case of the use of a fluidised bed reactor, the solid polymer in course of formation is kept in the fluidised state by means of a rising reaction gas mixture, comprising the alpha-olefins to be polymerised. This gaseous mixture leaving the reactor is generally cooled before being recycled into the reactor and an additional quantity of alpha-olefins corresponding to the quantities consumed is added to it. The start up of the polymerisation reaction in the gas phase is generally performed by introducing the catalyst system into a reactor fed with reaction gas mixture, and also containing a charge powder. This charge powder, consisting of solid particles, such as particles of polyolefin, is used to form the initial bed at the moment when the polymerisation reaction starts up, favouring in particular a suitable dispersion of the catalyst system in the reaction medium. Polymerisation may then be performed continuously, the catalyst system being introduced into the reactor continuously or in sequence. The polymer produced may be withdrawn from the reactor also continuously or in sequence.

In the industrial production of polyolefins, it may be necessary to stop the polymerisation reaction temporarily in order to be able to carry out various operations for maintaining or cleaning the reactor. Impurities such as water and oxygen may be introduced during these various operations into the polymerisation apparatus and/or into the charge powder introduced into the reactor when the reaction is restarted. Under these conditions and although the catalyst system used, of Ziegler-Natta type, is known for not having an induction period, the polymerisation reaction commences several hours after the commencement of introduction of the catalyst system into the reactor. The actual start up of polymerisation consequently takes place in the presence of a relatively high concentration of catalyst system in the fluidised bed, so that the polymerisation reaction speed may increase rapidly and abruptly, with the risk of forming localised hot spots and the bursting of polymer grains into fine particles. These localised hot spots may lead to the formation of agglomerates and setting of the polymer inside the reactor, and are liable to cause the stoppage of the polymerisation reaction. Moreover, in the special case of polymerisation in a fluidised bed, the fine particles, formed by the bursting of the grains making up the bed, are inevitably entrained out of this bed, which gives rise to a continuation of the polymeristion reaction outside the reactor.

These undesirable phenomena, such as in particular the formation of agglomerates, are amplified in the case of start up of copolymerisation reaction of two or more alpha-olefins, so that certain copolymerisation reactions of alpha-olefins cannot start up immediately under the conditions necessary to obtain the desired quality of copolymer.

Moreover, the considerably increased concentration of catalyst system in the fluidised bed at the moment when the reaction starts up appreciably modifies the conditions of development of the polymerisation or copolymerisation, so that the polymers or copolymers produced in the initial phase of the reaction have properties notably different from those of the desired products, especially as regards density, comonomer content, melt index, crystallinity and content of catalyst residues. It is then observed that it is necessary to produce a relatively high quantity of polyolefins before obtaining the product of desired quality, this quantity of polyolefins possibly representing, for example, from 3 to 6 times the capacity of the reactor for polymer or copolymer.

It has now been found that it is possible to avoid the difficulties mentioned above and to obtain the start up of the polymerisation or copolymerisation reaction immediately after the alpha-olefins have been brought into contact with the catalyst system and a charge powder, without the risk of formation of agglomerates or fine particles, the polyolefins produced during this period of start up having constant properties and having immediately the desired quality.

The object of the present invention is therefore a process for the polymerisation or copolymerisation in the gas phase of alpha-olefins by bringing the said alpha-olefins into contact, under polymerisation or copolymerisation conditions in a reactor in which the polymer or the copolymer is maintained in a fluidised bed and/or agitated with mechanical stirring, said reactor containing a charge powder, in the presence of a catalyst system of the Ziegler-Natta type consisting, as catalyst, of a compound of a transition metal of groups IV, V and VI of the Periodic Table of Elements, and as co-catalyst, an organometallic compound of a metal of groups I to III of this Table, which process comprises a start-up operation with the charge powder and being characterised in that, previously to the introduction of the catalytic system in the reactor, the charge powder is dehydrated and thereafter subjected to a treatment for at least five minutes by bringing the said charge powder in contact with at least one organoaluminium compound of the formula $AlR_nX_{3-n}$ in which R is an alkyl group comprising from 2 to 12 carbon atoms, X is a hydrogen or halogen atom, or an alcoholate group, and n is a whole number or fraction comprised between 1 and 3, the quantity of organoaluminium compound used being comprised between 0.1 and 50 millimoles per kilogram of charge powder.

The catalyst used according to the invention may correspond in particular to the general formula $$Mg_mMe_nM(OR_1)_p(R_2)_qX_rD_s$$

in which Mg is the magnesium atom, Me is an atom of aluminium and/or zinc, M is an atom of a transition metal belonging to groups IV, V and VI of the Periodic Table of Elements, preferably a titanium and/or vanadium atom, $R_1$ is an alkyl group comprising from 2 to 14 carbon atoms, $R_2$ is an alkyl group comprising from 2 to 12 carbon atoms, X is a chlorine and/or bromine atom, D is an electron donor compound comprising at least 1 atom of oxygen, or sulphur or nitrogen, or phosphorus, where:

m is comprised between 0.5 and 50, preferably between 1 and 10, n is comprised between 0 and 1, preferably between 0 and 0.5, p is comprised between 0 and 3, q is comprised between 0 and 1, preferably between 0 and 0.5, r is comprised between 2 and 104, preferably between 3 and 24, and s is comprised between 0 and 60, preferably comprised between 0 and 20.

With a view to the polymerisation of ethylene or copolymerisation of ethylene with at least one other alpha-olefin, the catalyst may be obtained by various processes, particularly by those according to which a magnesium compound, such as magnesium chloride, is ground in the presence of at least one transition metal compound, or else a magnesium compound is precipitated at the same time as one or more transition metal compounds.

The catalyst may, for example, be obtained by reacting an organomagnesium compound and a titanium compound at its maximum valency, optionally in the presence of an electron donor compound D chosen, for example, from amongst amines, amides, phosphines, sulphoxides and aliphatic ethers.

Preferably, the catalyst is obtained by reacting, at between $-20°$ and $150°$ C., and more especially between $50°$ and $100°$ C., one or more compounds of tetravalent titanium of the formula $$TiX_{4-t}(OR_1)_t$$

in which X is a chlorine or bromine atom, $R_1$ is an alkyl group comprising from 2 to 14 carbon atoms and t is a whole number or fraction comprised between 0 and 3, and an organomagnesium compound of the formula $(R_2)MgX$ or the formula $Mg(R_2)_2$ in which X is a chlorine or bromine atom and $R_2$ is an alkyl group comprising from 2 to 12 carbon atoms. The reaction between the titanium compound or compounds and the organomagnesium compound is advantageously effected in the presence of an alkyl halide of the formula $(R_2)X$ in which $R_2$ and X have the same definition as above, and optionally in the presence of the electron donor compound D, these various compounds being used in molar ratios such that:

$TiX_{4-t}(OR_1)_t/(R_2)MgX$ is comprised between 0.05 and 0.5, and preferably between 0.1 and 0.33, $(R_2)X/(R_2)MgX$ is comprised between 1 and 2, and $D/TiX_{4-t}(OR_1)_t$ is comprised between 0 and 0.5 and preferably between 0 and 0.2, or such that:

$TiX_{4-t}(OR_1)_t/Mg(R_2)_2$ is comprised between 0.05 and 0.5 and preferably between 0.1 and 0.33, $(R_2)X/Mg(R_2)_2$ is comprised between 2 and 4, and $D/TiX_{4-t}(OR_1)_t$ is comprised between 0 and 0.5 and preferably between 0 and 0.2.

Another technique for preparing the catalyst used in the process according to the invention consists in reacting at between $-20°$ C. and $150°$ C., and preferably between $50°$ C. and $100°$ C., magnesium metal with an alkyl halide and one or more compounds of tetravalent titanium, these latter compounds corresponding to the formulae $R_2X$ and $TiX_{4-t}(OR_1)_t$ respectively as defined above, optionally in the presence of the electron donor compound D. In this case the reactants may be used in molar ratios such that $TiX_{4-t}(OR_1)_t/Mg$ is comprised between 0.05 and 0.5, and preferably between 0.1 and 0.33, $(R_2)X/Mg$ is comprised between 0.5 and 8, and preferably between 1.5 and 5, and $D/TiX_{4-t}(OR_1)_t$ is comprised between 0 and 0.5 and preferably between 0 and 0.2, The catalyst may also be prepared by precipating a transition metal compound onto solid particles consisting essentially of magnesium chloride. For example, one may use solid particles of magnesium chloride, obtained by reacting an organomagnesium compound and a chlorinated organic compound, by employing in particular the following conditions:

the organomagnesium compound is either a dialkyl magnesium of the formula $R_3Mg\ R_4$, or an organomagnesium compound derivative of the formula $R_3Mg\ R_4, xAl(R_5)_3$, in which formulae $R_3$, $R_4$, and $R_5$ are identical or different alkyl groups comprising from 2 to 12 carbon atoms, and x is a number comprised between 0.01 and 1;

the chlorinated organic compound is an alkyl chloride of the formula $R_6Cl$, in which $R_6$ is a secondary or preferably tertiary alkyl group comprising from 3 to 12 carbon atoms;

the reaction is performed in the presence of an electron donor compound D, which may be chosen from amongst a wide variety of products such amines, amides, phosphines, sulphoxides, sulphones or aliphatic ethers.

Moreover, the various reagents employed for the preparation of such solid particles of magnesium chloride may be used under the following conditions:

the molar ratio $R_6Cl : R_3MgR_4$ is comprised between 1.5 and 2.5 and preferably between 1.85 and 2.2;

the molar ratio $R_6Cl : R_3MgR_4, xAl(R_5)_3$ is comprised between and $2.5(1+3x/2)$ and $2.5(1+3x/2)$, and preferably comprised between $1.85(1+3x/2)$ and $2.2(1+3x/2)$;

the molar ratio between the electron donor compound D and the organomagnesium compound ($R_3MgR_4$ or $R_3MgR_4, xAl(R_5)_3$ is comprised between 0.01 and 1;

the reaction between the organomagnesium compound and the chlorinated organic compound takes place with stirring in a liquid hydrocarbon, at a temperature comprised between $5°$ C. and $80°$ C.

The precipitation of a transition metal compound onto the solid particles of magnesium chloride may be performed by reducing a transition metal compound such as titanium or vanadium at its maximum valency, by means of organometallic compounds of metals of groups II and III of the Periodic Table of Elements.

Preferably a titanium compound is used of the formula $TiX_{4-t}(OR_1)_t$ in which $R_1$, X and t correspond to the definitions given above, the reduction being effected by means of a reducing agent chosen from amongst the organomagnesium compounds of the formula $R_3MgR_4$, in which $R_3$ and $R_4$ have the same definitions as aoove, organo-zinc compounds have the formula $Zn(R_7)_{2-y}X_y$, in which $R_7$ is an alkyl group comprising from 2 to 12 carbon atoms, X is a chlorine or bromine atom and y is zero, one or a fraction between zero and one, and organoaluminium compounds of the formula $Al(R_8)_{3-z}X_z$, in which $R_8$ is an alkyl group comprising from 2 to 12 carbon atoms, X is a chlorine or bromine atom and z is zero, one or two, or a fraction between zero and two.

The said reducing reaction may optionally be performed in the presence of an electron donor compound D such as defined above.

The relative quantities of the various compounds employed (magnesium chloride, titanium compound, organomagnesium, or organozinc or organoaluminium compound, electron donor), may be in molar ratios such that:
magnesium chloride:titanium compound is comprised between 1 and 8 and preferably between 2 and 5;
organomagnesiumor organozinc or organoaluminium compound : titanium compound less than 2 and preferably comprised between 0.5 and 1.5;
electron donor compound : titanium compound comprised between 0 and 1, preferably comprised between 0 and 0.5.

The precipitation may be performed at a temperature comprised between $-30°$ C. and $100°$ C. with stirring in a liquid hydrocarbon medium.

For the polymerisation of propylene or the copolymerisation of propylene with ethylene or other alpha-olefins, the catalyst should have not only a satisfactory polymerising activity, but also a high sterospecificity. In this case, one of the methods recommended for the preparation of the catalyst consists in impregnating the titanium tetrachloride with solid particles of magnesium chloride such as for example those obtained according to the method described above, this impregnation being carried out preferably in the presence of an electron donor compound D.

The preparation of such a catalyst may advantageously be performed according to a process comprising the following two stages:
(a) treatment of the solid particles of magnesium chloride with an electron donor compound D chosen in particular from amongst ester of aromatic acids or aromatic ethers,
(b) impregnation of the solid particles of magnesium chloride thus treated with titanium tetrachloride.

The quantity of electron donor compound D used during the first stage is generally comprised between 0.06 and 0.2 mole of electron donor compound per mole of magnesium compound and the treatment temperature may be comprised between approximately $20°$ C. and $50°$ C.

In the second stage the solid particles of magnesium chloride are impregnated with titanium tetrachloride used in the pure state or in a liquid hydrocarbon medium. One of the methods consists, in particular, in grinding the solid particles of magnesium chloride in the presence of titanium tetrachloride. The quantity of titanium tetrachloride should be sufficient to be able to fix on these particles from 0.5 to 3 gram atoms of titanium per 100 gram atoms of magnesium, and the impregnation temperature may be comprised between approximately $80°$ C. and $150°$ C.

The catalyst as prepared according to one of these methods generally occurs in the form of solid particles having a granulometry and polymerisation activity which may be difficult to make compatible with certain polymerisation conditions in the gas phase. In particular, the catalyst particles have a mean diameter by mass which is relatively small, generally less than 50 microns, which may render their direct use difficult, in particular, in a fluidised bed polymerisation reactor.

This is why it is preferable to use the catalyst system in the process of the invention either previously converted into the form of a coated catalytic system or into the form of a prepolymer, or else fixed on an inorganic granular support.

A conversion of the catalytic system into the form of a coated catalytic system or prepolymer is generally performed by bringing the catalyst and co-catalyst in contact with one or more alpha-olefins, in quantities such that the coated catalytic system or the prepolymer contains between 0.002 and 10 milligram atoms of transition metal per gram. The operation referred to as coating, consisting in converting the catalyst system in the form of a coated catalytic system is effected by polymerisation or copolymerisation of alpha-olefins, preferably in suspension in a liquid medium such as an aliphatic hydrocarbon. Generally speaking this operation may be continued until the coated catalyst system contains from 0.1 to 10 and preferably from 0.2 to 2 milligram atoms of transition metal per gram. The coated catalytic system may contain quantities of catalyst and cocatalyst such that the atomic ratio of the quantity of metal in the co-catalyst to the quantity of transition metal in the catalyst is comprised between 0.1 and 60, and preferably comprised between 0.2 and 10 and especially comprised between 0.5 and 5.

The operation known as prepolymerisation, consisting in converting the catalytic system into a prepolymer, may be effected in two stages. When the prepolymer is made in one stage, the prepolymerisation is performed as desired either in a suspension in a liquid medium or in the gas phase; generally, this stage may be continued, whilst preserving a suitable activity in the catalyst, until the prepolymer contains more than 0.002 and less than 0.1 and preferably more than 0.004 and less than 0.03 milligram atom of transition metal per gram. When the prepolymer is made in two stages, the first stage of the prepolymerisation is identical to the coating stage referred to above. The second stage of prepolymerisation may proceed as desired either in a suspension in a liquid medium or in the gas phase; generally, this stage may be continued, whilst preserving a suitable activity in the catalyst, until the prepolymer contains more than 0.002 and less than 0.1 and preferably more than 0.004 and less than 0.03 milligram atom of transition metal per gram.

The catalytic system may also be fixed on an inorganic granular support, consisting of refractory products chosen from among alumina, silica, aluminium silicate, titanium oxide, magnesia or a mixture or coprecipitate of at least two of these products. For example, this operation may be performed in the following manner. The catalyst may be converted into the form of a complex by dissolving it in an organic solvent consisting of an electron donor compound D chosen for preference from amongst the esters of carboxylic acids, aliphatic ethers, cyclic ethers and ketones. This complex in solution may then be isolated by precipitation, for example, either by cooling the solution or by adding to it a liquid hydrocarbon, then drying the solid complex thus obtained. The composition of this complex is such that:

the atomic ratio of the quantity of magnesium to the quantity of transition metal is comprised between 0.5 and 50, preferably comprised between 1 and 10, and the ratio of the number of gram molecules of electron donor compound D to the number of gram atoms of transition metal is comprised between 2 and 60, and preferably comprised between 3 and 20.

A catalyst thus put into the form of a complex may be fixed on the inorganic granular support by placing it in suspension in a liquid hydrocarbon such as n-hexane, in the presence of the said inorganic granular support and in the presence of the co-catalyst. The catalytic system fixed on the inorganic granular support is then obtained by evaporating the liquid hydrocarbon and drying the solid obtained.

One may also produce a dry mixture of the catalyst in the form of the solid complex prepared as above and of the inorganic granular support, the latter being preferably freed from any trace of water by heat treatment and having the co-catalyst added to it.

Another technique consists in mixing the catalyst in the form of a complex in solution in the organic solvent, previously prepared, with the inorganic granular support, the latter also being preferably freed from all traces of water by heat treatment, and having co-catalyst added to it. From this mixture a solid is isolated by evaporating the organic solvent. This solvent is then placed in suspension in a liquid hydrocarbon such as iso-pentane and co-catalyst is added to it. From this suspension the catalyst system fixed on the inorganic granular support is obtained by evaporating the liquid hydrocarbon.

The catalytic system fixed on the inorganic granular support may contain from 0.03 to 0.5 and preferably from 0.09 to 0.3 milligram atoms of transition metal per gram of supported catalyst.

The preparation of the catalytic system converted either into the form of a coated catalytic system or into the form of a prepolymer, or fixed on an inorganic granular support, may be carried out in such a way that the solid particles obtained have a mean diameter by mass comprised between 50 and 400 microns, and preferably comprised between 70 and 250 microns, which are dimensions compatible for use in a fluidised-bed and/or mechanically stirred gas phase polymerisation reactor.

Moreover, the catalytic system converted into the form of a prepolymer, or fixed on an inorganic granular support, contains quantities of catalyst and co-catalyst such that the atomic ratio of the quantity of metal in the co-catalyst to the quantity of transition metal in the catalyst is comprised between 0.1 and 60, and preferably comprised between 0.5 and 10.

As co-catalyst, organo-aluminium compounds are generally used, such as trialkylaluminium, or hydrides, halides or alcoholates of alkylaluminium, or organozinc compounds.

The charge powder used for the start up of polymerisation or copolymerisation consists of solid particles of an inorganic product, such as silica, aluminia, talc or magnesia, or else an organic product such as a polymer or copolymer. In particular the charge powder may be a polyolefin powder preferably of the same nature as that of the polyolefin powder to be produced, so that as soon as the reaction starts up, polyolefin of the desired quality is obtained immediately. Such a charge powder may in particular originate from a previous polymerisation or copolymerisation reaction. In this way one may use as charge powder a powder of a polyethylene, a polypropylene, a copolymer of ethylene with less than 20% by weight of one or more other alpha-olefins comprising, for example, from 3 to 12 carbon atoms, an elastomeric copolymer of ethylene with from 30 to 70% by weight of propylene, a copolymer of ethylene with less than 20% by weight of ethylene or one or more other alpha-olefins comprising from 4 to 12 carbon atoms, or a copolymer of propylene with from 10 to 40% by weight of 1-butene or a mixture of 1-butene and ethylene.

Advantageously the charge powder consists of particles having a mean diameter by mass comprised between 500 and 5000 microns, and preferably comprised between 200 and 3000 microns. The size of the charge powder particles is chosen partly as a function of the size of the polyolefin particles to be produced, and partly as a function of the type of polymerisation reactor and conditions of use of this reactor, such as for example the speed of fluidisation which may for example be comprised between 2 to 10 times the minimum speed of fluidisation of the polyolefin particles to be produced.

Although it was known that charge powders could be treated with alkylaluminium compounds, prior to polymerisation, in order to react with the water contained in the charge powder, it has been surprisingly found that a previous dehydration of the charge powder, before the treatment with the organoaluminium compouhd or compounds permits to avoid the formation of agglomerates. This previous dehydration is performed in conditions such that when the charge powder is brought into contact with an atmosphere of gas, for example inert gas, alpha-olefin, hydrogen or a mixture of at least two of these gases, the water content of this atmosphere, after dehydration is equal to or less than 15 vpm, and preferably equal to or less than 6 vpm. Surprisingly, it has been noted in fact that when the water content of such an atmosphere brought into contact with this charge powder is over 15 vpm, the charge powder particles tend to agglomerate during the treatment of the latter with the organoaluminium compound, which constitutes a particularly harmful phenomenon for the start up of polymerisation or copolymerisation in a fluidised bed and/or with mechanical stirring. The dehydration of the charge powder may be effected by subjecting it to one or more purge operations with inert gas, alpha-olefin, hydrogen or a mixture of at least two of these gases preferably having the lowest possible content of products regarded as catalyst system poisons, such as water. Thus for example, if during these purge operations an inert gas such as nitrogen is used, its water content is suitably less than 0.8 vpm and preferably less than 3 vpm.

These purge operations are performed according to techniques in themselves known, such as continuous scavenging of the charge powder or successive operations of pressurising and degassing the charge powder by means of gases or a mixture of gases as referred to above. They may be carried out under a pressure at least equal to atmospheric pressure, preferably under a pressure comprised between 0.1 and 5 MPa, at a temperature equal to or greater than 0° C., but less than the temperature at which the charge powder particles begin to soften and form agglomerates, and preferably at a temperature comprised between 40° and 120° C.

The treatment of the charge powder, consisting in bring it into contact with the organqaluminium compound, may take place in a fluidised bed and/or with mechanical stirring, in the presence of an inert gas, alpha-olefins, hydrogen, or a mixture of at least two of these gases. In particular the treatment may be performed in the presence of the reaction gas mixture to be used during polymerisation or copolymerisation.

As inert gas one uses a gas which is inactive in respective of the constituents of the catalyst system and the reactants used in the polymerisation or copolymerisation medium. It may be chosen for example from amongst nitrogen, argon, xenon, helium, methane, ethane, propane or butane. As alpha-olefins, one uses in particular the alpha-olefins to be polymerised or copolymerised, which may comprise from 2 to 12 carbon atoms, such as for example, ethylene, propylene, 1-butene, 1-hexane, 4-methyl-1-pentene or 1-octene.

The treatment of the charge powder may be carried out under a pressure at least equal to atmospheric pressure and preferably under a pressure comprised between 0.1 and 5 MPA at a temperature comprised between 0° and 120° C. and preferably at a temperature equal to or greater than 40° C., but below the temperature which the particles of charge powder begin to soften and form agglomerates.

The organoaluminium compound used according to the invention may be chosen from amongst the trialkylaluminium compounds or hydrides, chlorides or alcoholates of alkylaluminium. Generally it is preferred to use a trialkylaluminium such as triethylaluminium, trisobutylaluminium, tri-n-hexyl-aluminium or tri-n-octyl aluminium. In certain cases, especially with a view to simplifing the process of the invention, the organoaluminium compound may advantageouly be of the same nature as that used as co-catalyst associated with the catalyst in the catalyst system.

The organoaluminium compound used in this treatment of the charge powder may be used as it is, or preferably in the form of a solution in a saturated aliphatic hydrocarbon which may comprise from 4 to 6 carbon atoms, in order to faciliate its dispersion in the charge powder.

The quantity of organoaluminium compound used according to the invention is comprised between 0.1 and 50 millimoles, and preferably comprised between 1 and 20 millimoles per kilogram of charge powder. It has been observed, in fact, that the use of a quantity of organoaluminium compound of less than 0.1 millimole per kilogram of charge powder does not permit of achieving the instantaneous start up of the polymerisation or copolymerisation reaction as soon as the alpha-olefins have been brought into contact with the charge powder in the presence of the catalyst system, and after the start up of this reaction leads for a certain period, to the production of a polyolefin quality which is not desired. The use of a quantity of organoaluminium compound of over 50 millimoles per kilogram of charge powder, on the other hand, brings about an instantaneous start up of the reaction as soon as the alpha-olefins have been brought into contact with the charge powder in the presence of the catalyst system, but generally at too high a level of activity, so that local hot spots may be produced in the fluidised bed and lead to the formation of agglomerates. Furthermore, it is noted that the use of too great a quantity of organoaluminium compound during the charge powder treatment may favour a catalytic reaction of hydrogenation of the alpha-olefins, to the detriment of the polymerisation or copolymerisation reaction, especially when the reaction gas mixture employed for the polymerisation or copolymerisation consists of alpha-olefins and hydrogen.

In order to provide the most efficient treatment of the charge powder, it is important that this treatment should last at least five minutes and preferably over 15 minutes. It has been observed, in fact, that when the duration of the treatment is less than 5 minutes, the polymerisation or copolymerisation reaction does not start up immediately when the alpha-olefins are brought into contact with the charge powder in the presence of the catalyst system.

Contacting the alpha-olefins with the charge powder in the presence of the catalytic system may be performed in a manner in itself known, by means of a polymerisation or copolymerisation reactor with a fluidised bed and/or with mechanical stirring. This charge powder is introduced into the reactor which is also fed with a reaction gas mixture consisting of 1 or more alpha-olefins and optionally hydrogen and/or one or more inert gases, under the conditions of the polymerisation or copolymerisation reaction in the gas phase, that is to say under a pressure generally comprised between 0.1 and 5 MPa, preferably comprised between 0.5 and 4 MPa, and at a temperature generally comprised between 0° and 115° C., preferably comprised between 40° and 110° C.

Surprisingly, it has been observed that when one wishes to attain in an advantageous manner, in a relatively short time, a stable production of polyolefin of the desired quality, it is possible thanks to the process of the invention to perform the initial stage of the polymerisation or copolymerisation in the presence of the catalytic system in a relatively large quantities, without forming agglomerates or fine particles. In particular, it becomes possible to achieve this contacting in the presence of a quantity of catalytic system of up to 10 times the minimum quantity necessary to obtain the stable production of the desired polymerisation or copolymerisation, for a period corresponding to the production of a quantity by weight of olefins comprised between 1 and 6 times, and preferably comprised between 1 and 3 times the quantity by weight of charge powder employed.

The polymerisation or copolymerisation of the alpha-olefins may also be performed in the presence of an additional quantity of co-catalyst comprised between 0.01 and 10 millimoles, and preferably comprised between 0.1 and 5 millimoles per kilogram of polyolefin produced, this co-catalyst may be of a nature identical to or different from that of the co-catalyst which forms part of the catalytic system used. This addition of co-catalyst in particular makes it possible to increase the yield of the polymerisation or copolymerisation reaction, and consequentially to reduce the catalyst residue in the polyolefins produced. It may advantageously be carried out when the weight of polyolefins produced is equal to or greater than 0.1 times, and preferably equal to or greater than 0.3 times the weight of the charge powder employed. The contacting in the presence of this additional quantity of co-catalyst may then be continued throughout the duration of the polymerisation or copolymerisation reaction.

According to rhe process of the invention, it is possible to polymerise or copolymerise olefins which may comprise from 2 to 12 carbon atoms, in a fluidised bed and/or with mechanical stirring under very advantageous and very simple conditions, making it possible in particular as soon as the polymerisation or copolymerisation commences, to obtain polymers or copolymers of the desired quality under excellent conditions of yield and productivity of the industrial plant. For example, using the process of the invention it is possible to produce easily high density polyethylene (density above 0.940), which include homopolymers of ethylene and copolymers of ethylene and alpha-olefins comprising from 3 to 12 carbon atoms, linear low density polyethylene (density less than 0.940), consisting of a copolymer of ethylene and 1 or more alpha-olefins comprising from 3 to 12 carbon atoms, with a content by weight of units derived from ethylene of over 80%, elastomeric terpolymers of ethylene, propylene and dienes, elastomeric copolymers of ethylene and propylene, having a content by weight of units derived from ethylene comprised between about 30 and 70%, isotactic polypropylene and copolymers of propylene and ethylene or other alpha-olefins, having a content by weight of units derived from propylene of over 90%, copolymers of propylene, 1-butene and optionally ethylene having a content by weight of units derived from 1-butene and optionally ethylene comprised between 10 and 40%.

The following non-restrictive examples illustrate the present invention.

EXAMPLE 1

Preparation of the Catalyst

Into a 1-liter glass flask provided with a stirrer system and a heating and cooling device, there are introduced successively at 25° C.:
500 ml of n-hexane
9.6 g of powdered magnesium,
1.2 g of iodine.
With stirring, the contents of the flask are heated to 80° C. and there are introduced:
9.1 g of titanium tetrachloride,
13.7 g of tetrapropyltitanate,
and, over 4 hours 74.5 g of n-butyl chloride.
The precipitate obtained is washed 3 times decanting each time with 200 ml of n-hexane. After drying, the catalyst (A) thus obtained is analysed; it contains 8% by weight of titanium.

Preparation of the Prepolymer

Into a 5-liter stainless steel reactor, equipped with a stirrer system rotating at 750 revolutions per minute, there are introduced under nitrogen 3 litres of n-hexane heated to 70° C., 9.6 millilitres of a molar solution of tri-n-octylaluminium (TnOA) in n-hexane and a quantity of catayst (A) prepared previously containing 12 milligram atoms of titanium. There is then introduced a quantity of hydrogen corresponding to a partial pressure of 0.05 MPa, then ethylene at a throughput of 160 g/hr for 3 hours. The prepolymer obtained (B) is then dried under an atmosphere of nitrogen; it contains 0.025 milligram of titanium per gram.

Start up of Polymerisation in a Fluidised Bed

A fluidised-bed type reactor in stainless steel, 90 cm in diameter, previously kept under an atmosphere of nitrogen, is subjected to a purge consisting in successive operations of pressurising the reactor at 1.8 MPa with nitrogen at 90° C., following by degassing to atmospheric pressure, these operations being repeated 4 times, the nitrogen used moreover having a content of water of below 0.3 vpm. Thereafter, a continuous stream of nitrogen at 90° C. is passed into the reactor until the water content of the atmosphere in the reactor is reduced to 10 vpm. There are then introduced into the reactor under an atmosphere of nitrogen as charge powder, 270 kg of a polyethylene powder with a bulk density of 0.4 g/cm$^3$, a titanium content of 13 ppm and a melt index (MI$_{2.16}$) measured at 190° C. under charge of 2.16 kg equal to 7.2 g/10 minutes. This powder consists of solid particles having a mean diameter by mass of 850 microns. The reactor containing polyethylene powuer is subjected to dehydration with nitrogen at 90° C., until the water content in the atmosphere of the reactor is reduced to a value of 3 vpm. There is then introduced into the reactor a gas mixture consisting of hydrogen, ethylene and nitrogen, propelled at a rising speed of 45 cm/s at 90° C. The partial Pressures (pp) of the 3 constituents of this gaseous mixture are as follows:
pp hydrogen = 0.700 MPa
pp ethylene = 0.597 MPa
pp nitrogen = 0.703 MPa.
There are then introduced into the reactor 2.5 liters of a molar solution of TnOA in n-hexane, and the reactor is maintained under these conditions in this way for 1 hour. Then there is introduced into the reactor in sequence at the rate of injection of 70 g every 3 minutes, the prepolymer (B) prepared previously.

Table 1 sets out the reaction conditions of polymerisation and the properties of the polyethylene making up the fluidised bed during the start up period of the reaction, and as measured at intervals during the polymerisation.

TABLE I

Development of polymerisation conditions and properties of the polyethylene making up the fluidised bed during the start up period of polymerisation.

| | Time (h) | | | | | | | | |
|---|---|---|---|---|---|---|---|---|---|
| | 0 | 1 | 2 | 4 | 6 | 8 | 10 | 14 | 18 | 24 |
| Cumulative Production of polyethylene (kg) | 0 | 85 | 240 | 494 | 740 | 995 | 1150 | 1650 | 2130 | 2450 |
| Mean residence time of the polyethylene in the reactor (h) | — | 3.2 | 2.8 | 2.1 | 2.2 | 2.1 | 3.5 | 2.5 | 2.6 | 3.4 |

TABLE I-continued

Development of polymerisation conditions and properties of the polyethylene making up the fluidised bed during the start up period of polymerisation.

| | Time (h) | | | | | | | | |
|---|---|---|---|---|---|---|---|---|---|
| | 0 | 1 | 2 | 4 | 6 | 8 | 10 | 14 | 18 | 24 |
| Titanium content of the polyethylene (ppm) | 13 | — | — | 13 | — | 13 | — | 12 | 11 | 11 |
| $MI_{2.16}$ of polyethylene (g/10 minutes) | 7.2 | — | — | 7.2 | — | 7.2 | — | 7.2 | 7.2 | 7.2 |

On analysing this Table it is found that as soon as the prepolymer is introduced into the reactor, the polymerisation reaction starts up and the properties (titanium content and melt index) of the polyethylene powder making up the fluidised bed remains more or less constant throughout the entire period of start up of the reaction, and in particular remain more or less identical to the properties of the charge powder initially introduced into the reactor. Furthermore, no formation of polyethylene agglomerate is observed in the reactor during the start up of this reaction.

EXAMPLE 2

Start up of Polymerisation in a Fluidised Bed

One operates exactly as in Example 1, except for the fact that instead of using a fluidised bed reactor which has been previously purged by an atmosphere of nitrogen, one uses a reactor previously maintained under an atmosphere of ambient air, and instead of introducing 2.5 litres of a molar solution of TnOA in n-hexane into it, 4 liters of this solution are introduced.

The start up of the polymerisation reaction otherwise proceeds in a manner identical to that of the start up described in Example 1. The desired quality of polyethylene is obtained at once, this quality in particular being substantially identical to that of the charge powder initiallly introduced into the reactor. No formation of polyethylene agglomerate is observed in the fluidised bed reactor during the start up of this reaction.

EXAMPLE 3 (COMPARATIVE)

Start up of Polymerisation in a Fluidised Bed

One operates exactly as in Example 1, except for the fact that the operations of start up of the polymerisation do not comprise the introduction of TnOA into the reactor containing the charge powder.

Table 2 sets out the conditions of the polymerisation reaction and the properties of the polyethylene making up the fluidised bed during the period of start up of the reaction, and also the development of these as time goes on.

On analysis of this Table it is found that the polymerisation reaction does not start up immediately after the introduction of the prepolymer into the reactor, and that the titanium content of the polyethylene making up the fluidised bed increases during the first 14 hours of introduction of prepolymer into the reactor up to a value equal to 110 ppm. Others characteristics of the polyethylene powder making up the fluidised bed, such as the melt index ($MI_{2.16}$) changed during the period of start up of the reaction.

TABLE 2

Development of the polymerisation conditions and properties of the polyethylene making up the fluidised bed during the start up period of polymerisation.

| | Time (h) | | | | | | | | | | |
|---|---|---|---|---|---|---|---|---|---|---|---|
| | 0 | 1 | 2 | 4 | 6 | 8 | 10 | 14 | 18 | 24 | 36 |
| Cumulative Production of polyethylene (kg) | 0 | 0 | 0 | 0 | 0 | 1 | 5 | 13 | 220 | 620 | 1607 |
| Mean residence time of the polyethylene in the reactor (h) | — | — | — | — | — | — | 137 | 137 | 7.5 | 4.1 | 5.5 |
| Titanium content of the polyethylene (ppm) | 13 | 29 | 44 | 65 | 74 | 89 | 99 | 110 | 89 | 63 | 17 |
| $MI_{2.16}$ of polyethylene (g/10 minutes) | 7.2 | 6.5 | 5.7 | 5.0 | 4.6 | 4.1 | 4.1 | 5.3 | 6.5 | 7.2 | 7.2 |

EXAMPLE 4

Start up of Polymerisation in a Fluidised Bed

One operates exactly as in Example 1, except for the fact that at the end of a period of 4 hours from commencement of introduction of the prepolymer, one commences to introduce continuously, direct into the reactor, 200 ml/h of a molar solution of TnOA in n-hexane, separately from the prepolymer. During the following four hours, the quantity of prepolymer introduced into the reactor is gradually reduced until a quantity corresponding to an injection of 70 g of prepolymer (B) is injected every 9 minutes.

Table 3 sets out the condition of the polymerisation reaction and the properties of the polyethylene making up the fluidised bed during the start up period of the reaction, and also the development of these values as time goes on.

TABLE 3

Development of the polymerisation conditions and properties of the polyethylene making up the fluidised bed during the start up period of polymerisation.

| | Time (h) | | | | | | | | | |
|---|---|---|---|---|---|---|---|---|---|---|
| | 0 | 1 | 2 | 4 | 6 | 8 | 10 | 14 | 18 | 24 |
| Cumulative Production of polyethylene (kg) | 0 | 85 | 240 | 500 | 740 | 1010 | 1200 | 1720 | 2200 | 2580 |
| Mean residence time of the polyethylene in the reactor (h) | — | 3.2 | 2.8 | 2.2 | 2.3 | 2.4 | 3.4 | 2.8 | 3.0 | 3.4 |
| Titanium content of the polyethylene (ppm) | 13 | — | — | 13 | — | 12 | — | 10 | 9 | 8 |
| $MI_{2.16}$ of polyethylene (g/10 minutes) | 7.2 | — | — | 7.2 | — | 7.2 | — | 7.2 | 7.2 | 7.2 |

On analysing this Table it is found that the properties of the polyethylene powder making up the fluidised bed remain more or less constant during the start up period of the reaction, and in particular more or less identical to the properties of the charge powder initially introduced into the reactor. In particular, the titanium content of the polyethylene powder never exceeds 13 ppm, but on the other hand decreases very notably as from the commencement of introduction into the reactor of a molar solution of TnOA in n-hexane separtely from the prepolymer.

EXAMPLE 5

Start up of Copolymerisation in a Fluidised Bed

A fluidised-bed type reactor in stainless steel, 90 cm in diameter previously kept under an atmosphere of nitrogen, is subjected to a purge consisting in successive operations of the pressurising the reactor at 1.8 MPa with nitrogen at 90° C., followed by degassing to atmospheric pressure, these operations being repeated 4 times, the nitrogen employed having a content of water below 0.3 vpm. Thereafter, a continuous stream of nitrogen at 90° C. is passed into the reactor, the water content of the nitrogen stream at the outlet of the reactor is reduced to 10 vpm. There are then introduced into the reactor under nitrogen as charge powder, 270 kg of a powder of a copolymer of ethylene and 1-butene having a bulk density of 0.3 g/cm³, a titanium content of 13 ppm, a content by weight of units derived from 1-butene of 7.8%, a density (at 20° C.) of 0.918 and a melt index ($MI_{2.16}$) measured at 190° C. under a charge of 2.16 kg equal to 0.9 g/10 minutes. The powder consists of solid particles having a mean diameter by mass of 850 microns. The reactor containing the copolymer powder is subjected to dehydration with nitrogen at 90° C. until the content of water in the atmosphere of the reactor is reduced to a value of 3 vpm. There are then introduced into the reactor a gaseous mixture consisting of hydrogen, ethylene, 1-butene and nitrogen, propelled at a rising speed of 50 cm/sec at 85° C. The partial pressures (pp) of the four constituents of this gas mixtures are as follows:

pp hydrogen = 0.123 MPa
pp ethylene = 0.560 MPa
pp 1-butene = 0.224 MPa
pp nitrogen = 0.690 MPa.

There are then introduced into the reactor 2.5 liters of a molar solution of TnOA of n-hexane, and the reactor is maintained under these conditions in this way for 1 hour. Then there are introduced into this reactor in sequence at a rate of an injection of 70 g every 3 minutes, the prepolymer (B) prepared in example 1.

At the end of 4 hours from the commencement of introduction of the prepolymer, one introduces continuously, direct into the reactor 200 ml/h of molar solution of TnOA in n-hexane, independently of the prepolymer. During the following 4 hours, the quantity of prepolymer introduced into the reactor is gradually decreased until a quantity corresponding to an injection of 70 g of prepolymer (B) is injected every 9 minutes.

Table 4 sets out the conditions of the copolymerisation reaction and the properties of the copolymer making up the fluidised bed during the period of start up of the reaction, and also the development of these as time goes on.

TABLE 4

Development of the copolymerisation conditions and properties of the copolymer making up the fluidised bed during the start up period of copolymerisation

| | Time (h) | | | | | | | | | |
|---|---|---|---|---|---|---|---|---|---|---|
| | 0 | 1 | 2 | 4 | 6 | 8 | 10 | 14 | 18 | 24 |
| Cumulative Production of copolymer (kg) | 0 | 85 | 250 | 510 | 760 | 1020 | 1280 | 174 | 22700 | 2600 |
| Mean residence time of the polyethylene in the reactor (h) | — | 3.2 | 2.8 | 2.3 | 2.4 | 2.5 | 3.5 | 2. | 2.66 | 3.4 |
| Titanium content of the copolymer (ppm) | 13 | — | — | 13 | — | 12 | — | 10 | 9 | 8 |

TABLE 4-continued

| | Development of the copolymerisation conditions and properties of the copolymer making up the fluidised bed during the start up period of copolymerisation | | | | | | | | | |
|---|---|---|---|---|---|---|---|---|---|---|
| | Time (h) | | | | | | | | | |
| | 0 | 1 | 2 | 4 | 6 | 8 | 10 | 14 | 18 | 24 |
| $MI_{2.16}$ of polyethylene (g/10 minutes) | 0.9 | — | — | 0.9 | — | 0.9 | — | 0. | 0.99 | 0.9 |
| Density of the copolymer | 0.918 | — | — | 0.918 | — | 0.918 | — | 0.918 | 0.918 | 0.918 |

On analysing this Table it is found that as soon as prepolymer is introduced into the reactor, the copolymerisation reaction starts up and the properties (titanium content, melt index and density) of the copolymer powder making up the fluidised bed remain more or less constant throughout the period of start up of the reaction, and especially remain more or less identical to the properties of the charge powder initially introduced into the reactor. Furthermore, no formation of copolymer agglomerates is observed in the fluidised bed reactor during the start up of this reaction.

EXAMPLE 6 (COMPARTIVE)

Start up of Copolymerisation in a Fluidised Bed

One operates exactly as in example 5, except for the fact that the start up operations of the copolymerisation do not involve the introduction of TnOA into the reactor containing the charge powder.

It is found that after the introduction of the prepolymer (B) into the reactor, the copolymerisation reaction does not start up immediately and that one must wait for 8 hours from the introduction of the prepolymer (B) to observe the start up of the reaction. Furthermore, it is found that the properties of the copolymer making up the fluidised bed change during the period of start up of the reaction and that in particular the titanium content, density of the copolymer increases very appreciably, whereas the melt index of the copolymer decreases.

After 30 hours of introduction of the prepolymer (B) into the reactor, copolymer agglomerates form in the fluidised bed, necessitating the stoppage of the copolymerisation reaction.

EXAMPLE 7 (COMPARATIVE)

Start up of Copolymerisation in a Fluidised Bed

One operates exactly as in example 5 except for the fact that instead of reducing the water content in the atmosphere of the reactor before and after the introduction of the charge powder to 10 and 3 vpm respectively, it is reduced only to 25 and 20 vpm respectively.

It is found that the copolymerisation reaction does not start up immediately after the introduction of the prepolymer into the reactor, and that the properties of the copolymer making up the fluidised bed develop appreciably during the period of start up of the reaction, so that the copolymer produced after the start up of the reaction does not conform to the desired quality. Furthermore, copolymer agglomerates are very rapidly formed in the reactor, necessitating the stoppage of the copolymerisation reaction.

EXAMPLE 8

Start up of the Copolymerisation in a Fluidised Bed

One operates exactly as in example 5, except for the fact the instead of introducing into the reactor 270 kg of a copolymer powder of ethylene and 1-butene, 270 kg of a copolymer powder of ethylene, 1-butene and 4-methyl-1-pentene are introduced, having a bulk density equal to 0.3 g/cm$^3$, a titanium content of 13 ppm, a content by weight of units derived from 1-butene of 5.5%, a content by weight of units derived from 4-methyl-1-butene of 2.7%, a density (at 20° C.) of 0.917 and a melt index ($MI_{2.16}$) equal to 0.9g/10 minutes, this powder consisting of solid particles having a mean diameter by mass of 850 microns.

Moreover, instead of introducing into the reactor a gas mixture consisting of hydrogen, ethylene, 1-butene and nitrogen, there is introduced a gas mixture consisting of hydrogen, ethylene, 1-butene, 4-methyl-1-pentene and nitrogen. The partial pressures (pp) of the five constituents of this case mixture are as follows:

pp hydrogen = 0.083 MPa
pp ethylene = 0.360 MPa
pp 1-butene = 0.108 MPa
pp 4-methyl-1-pentene = 0.030 MPa
pp nitrogen = 1.019 MPa The start up of the copolymerisation reaction proceeds for the rest in a manner identical to that of the start up described in example 5.

Table 5 sets out the copolymerisation conditions and the properties of the copolymer obtained during the start up of the reaction, and also the development of these as time goes on.

On analysing this Table it is found that as soon as the prepolymer is introduced into the reaction the reaction starts up, and that throughout the start up of this reaction the properties of the copolymer powder making up the fluidised bed remain more or less constant and identical to those of the charge powder. Furthermore, no formation of copolymer agglomerates is observed during the start up of this reaction.

TABLE 5

| | Development of the copolymerisation conditions and properties of the copolymer obtained during the start up | | | | | | | | | |
|---|---|---|---|---|---|---|---|---|---|---|
| | Time (h) | | | | | | | | | |
| | 0 | 1 | 2 | 4 | 6 | 8 | 10 | 14 | 16 | 24 |
| Cumulative Production of copolymer (kg) | 0 | 80 | 220 | 470 | 700 | 950 | 1060 | 1230 | 1870 | 2180 |
| Mean residence | — | 3.2 | 2.8 | 2.6 | 2.5 | 3.0 | 3.5 | 3.3 | 2.6 | 2.3 |

TABLE 5-continued

Development of the copolymerisation conditions and properties of the copolymer obtained during the start up

| | Time (h) | | | | | | | | |
|---|---|---|---|---|---|---|---|---|---|
| | 0 | 1 | 2 | 4 | 6 | 8 | 10 | 14 | 16 | 24 |
| time of the polyethylene in the reactor (h) | | | | | | | | | | |
| Titanium content of the copolymer (ppm) | 13 | — | — | 13 | — | 12 | — | 10 | 9 | 9 |
| MI$_{2.16}$ of polyethylene (g/10 minutes) | 0.9 | — | — | 0.9 | — | 0.9 | — | 0.9 | 0.9 | 0.9 |
| Density of the copolymer | 0.917 | — | — | 0.917 | — | — | — | 0.917 | — | 0.917 |

EXAMPLE 9

Preparation of the Catalyst (Supported Catalyst)

(a) Preparation of the Support

Into a glass reactor having a capacity of 1 liter, equipped with a stirrer system rotating at 750 revolutions per minute, there are introduced at ambient temperature and under nitrogen 550 ml of a solution of dibutylmagnesium in n-hexane containing 500 milligram atoms of magnesium and 51 ml of di-isoamylether (250 millimoles).

The reactor is then heated to 50° C., and there are poured in, drop by drop over 2 hours, 115 ml of tertbutyl chloride (1050 millimoles). At the end of this addition, the suspension is maintained at 50° C. for 2 hours and the precipitate obtained is washed at this same temperature with n-hexane.

The support (C) thus formed contains per gram atom of magnesium : 2.0 gram atoms of chlorine and 0.011 mole of diisoamyl ether.

On examination under the microscope, the support (C) is seen to be in the form of spheroidal particles having a mean diameter by mass of 38 microns; it is found that more than 90% by weight of the particles have a mean diameter by mass comprised between 34 and 42 microns; these particles have a smooth surface, as specific surface area equal to 42 m$^2$/g (BET) and a density equal to 1.3.

(b) Prepartion of the Supported Catalyst

Into a glass reactor with a capacity of 1-liter and equipped with a stirrer system rotating at 250 revolutions per minute, there are introduced under nitrogen 500 ml of a suspension in n-hexane of the support (C) prepared previously, this suspension containing 0.2 gram atoms of magnesium. After decanting, the supernatant hydrocarbon phase is withdrawn. The reactor is then heated to 50° C. and there are introduced into it 2 ml of ethyl benzoate (14 millimoles). The suspension is maintained with stirring for two hours, then 2 moles of pure titanium tetrachloride are introduced (220 ml). The temperature is raised to 80° C., and this temperature is maintained for 2 hours. The solid obtained is then washed with n-hexane at 50° C. to give the catalyst (D) ready for use, in the form of a suspension in n-hexane.

Analysis of the catalyst (D) shows that it contains per gram atom of magnesium : 2.05 gram atoms of chlorine, 0.014 gram atom of titanium, 0.016 mole of ethyl benzoate and that it contains no trace of diisoamylether.

The catalyst thus defined is a powder of a yellow-greyish colour consisting of particles of spheroidal shape, having a mean diameter by mass of 38 microns.

Prepartion of the Prepolymer

Into a 5 liter stainless steel reactor, equipped with a stirrer system rotating at 750 revolutions per minute, there are introduced under nitrogen 25 millimoles of tri-isobutylaluminium, 9.25 millimoles of ethylbenzoate and a quantity of the catalyst (D) prepared previously corresponding to 2.5 milligram atoms of titanium. The volume of the suspension is made up to 2 liters of n-hexane which is heated to 60° C. There is then introduced into the reactor a volume of 30 ml of hydrogen measured under normal conditions, then propylene at a throughput of 200 g/h for 2½ hours. At the end of this time the suspension of prepolymer if maintained with stirring for a further half hour. It is cooled to ambient temperature (20° C.) and the reactor is degassed. Then under nitrogen the prepolymer powder is washed 3 times with n-hexane. The suspension of prepolymer is n-hexane is then decanted under vacuum into a rotary evaporator. In this way one obtains 510 g of a prepolymer powder (E) containing 0.005 milligram atoms of titanium per gram.

Start up of Polymerisation in a Fluidised Bed

A fluidised bed type reactor, in stainless steel, with a diameter of 45 cm, previously kept under an atmosphere of nitrogen is subjected to a purge consisting in successive operations of pressurising the reactor at 1.8 MPa with nitrogen at 90° C., followed by degassing to atmospheric pressure, these operations being repeated 4 times, the nitrogen used having a water content less than 0.3 vpm. Thereafter, a continuous stream of nitrogen at 90° C. is passed into the reactor, until the water content of the nitrogen at the outlet of the reactor is reduced to 10 vpm. There are then introduced into the reactor under nitrogen as charge powder, 70 kg of a polyproylene powder, with a bulk density of 0.5 g/cm$^3$, a titanium content of 8 ppm, a content of polymer insoluble in boiling n-hexane of 91% by weight, and a melt index (MI$_5$) measured at 190° C. under a charge of 5 kg equal to 2.3 g/10 minutes. This powder consists of solid particles having a mean diameter by mass of 300 microns. The reactor containing the polypropylene powder is subjected to dehydration with nitrogen at 90° C., until the water content of the atmosphere in the reactor is reduced to a value of 3 vpm. There is then introduced into the reactor a gas mixture consisting of hydrogen, propylene and nitrogen propelled at a rising speed of 45 cm/sec at 60° C. The partial pressures (pp) of the three constituents of this gaseous mixture are as follows:
pp hydrogen=0.1 MPa
pp propylene=1.5 MPa
pp nitrogen=0.4 MPa.

There is then introduced into the reactor 0.7 liter of a molar solution of TnOA in n-hexane, and the reactor is maintained under these conditions in this way for 1 hour. Then one commences to introduce into this reactor in sequence at the rate of 1 injection of 40 g every 3 minutes, the prepolymer (E) prepared previously.

At the end of approximately 1 hour from the commencement of introduction of the prepolymer, there is introduced continuously, direct into the reactor, 450 ml/hr of a molar solution of TnOA in n-hexane.

It is found that the prepolymerisation reaction starts up as soon as the prepolymer is introduced into the reactor, and that for the first 24 hours of the reaction the titanium content of the polypropylene powder making up the fluidised bed never exceeds 8 ppm, the melt index (MI$_5$) and the content of polymer insoluble in boiling n-hexane remaining more or less constant and equal to 2.3 g/10 minutes and 91% by weight respectively. Furthermore, no formation of polypropylene agglomerate is observed in the reactor during the start up of this reaction.

EXAMPLE 10

Start up of Polymerisation in a Fluidised Bed

On operates exactly as in Example 9, except for the fact that instead of using a fluidised bed reactor which has previously been kept under an atmosphere of nitrogen, one uses a reactor previously kept under an atmosphere of ambient air, and instead of introducing 0.7 liter of a molar solution of TnOA in n-hexane into it, 1.2 liters of this solution are introduced.

The start up of the polymerisation reaction otherwise proceeds in a manner identical to that of the start up described in Example 9. The desired quality of polypropylene is obtained immediately, this quality being more or less identical to that of the charge powder initially introduced into the reactor. No formation of polypropylene agglomerate is found in the fluidised bed reactor during the start up of this reaction.

EXAMPLE 11

Start up of Copolymerisation in a Fluidised Bed

A fluidised bed type reactor in stainless steel, with a diameter of 45 cm, previously kept under an atmosphere of nitrogen, is subjected to a purge consisting in successive operations of pressurising the reactor at 1.8 MPa with nitrogen at 90° C., followed be degassing to atmospheric pressure, these operations being repeated 4 times, the nitrogen employed having a water content of less than 0.3 vpm. Thereafter, a continuous stream of nitrogen at 90° C. is introduced into the reactor, until the water content of the nitrogen at the outlet of the reactor is reduced to 10 vpm. There are then introduced into the reactor under an atmosphere of nitrogen as charge powder, 70 kg of a copolymer powder and ethylene, having a bulk density of 0.4 g/cm$^3$, a titanium content of 10 ppm, a content by weight of units derived from ethylene of 5% and a melt index (MI$_5$) measured at 190° C. under a charge of 5 kg equal to 3 g/10 minutes. This powder consists of solid particles having a mean diameter by mass of 300 microns. The reactor containing the copolymer powder is subjected to dehydration with nitrogen at 60° C., until the water content of the atmosphere in the reactor is reduced to a value of 3 vpm. There is then introduced into the reactor a gaseous mixture consisting of hydrogen, propylene, ethylene and nitrogen, propelled at a rising speed of 45 cm/sec, at a temperature of 60° C. The partial pressures (pp) of the four constituents of this gaseous mixture are as follows:
pp hydrogen=0.1 MPa
pp propylene=1.5 MPa
pp ethylene=0.1 MPa
pp nitrogen=0.3 MPa.

There is then introduced into the reactor 0.7 liter of a molar solution of tri-n-octylaluminium (TnOA) in n-hexane, and in this way the reactor is maintained under these conditions for 1 hour. Then there is introduced into this reactor in sequence at the rate of 1 injection of 40 g every minute, the prepolymer (E) prepared in Example 9.

At the end of approximately 1 hour after the commencement of introduction of prepolymer, there are introduced continuously, direct into the reactor, 450 ml/hr of a molar solution of TnOA in n-hexane.

It is found that the copolymerisation reaction starts up as soon as the prepolymer is introduced into the reactor, and that during the first 24 hours of the reaction, the titanium content of the copolymer powder making up the fluidised bed never exceeds 10 ppm, the content by weight of units derived from ethylene and the melt index (MI$_5$) of this copolymer remaining constant and equal to 5% and 3 g/10 minutes respectively. Furthermore, no formation of copolymer agglomerate is observed in the reactor during the start up of this reaction.

EXAMPLE 12

Preparation of the Catalyst

One operates in a 1-liter glass reactor provided with a mechanical stirrer system and a heating and cooling device. There are introduced into this reactor 380 g of titanium tetrachloride, 120 ml of n-hexane and 27 g of di-isoamylether at 25° C. The mixture is heated to 35° C. and at this temperature there are introduced into it over 4 hours, at a regular throughput, a solution at 25° C. obtained by mixing 70 g of di-isoamylether and 30 g diethylaluminium chloride dissolved in 180 ml of n-hexane. A precipitate is obtained which is maintained with stirring for 1 hour at 35° C., then over 2 hours at 65° C. The precipitate obtained, which contains 0.49 gram atom of titanium, is washed 5 times by decanting with 500 ml of n-hexane at 65° C. The catalyst (F) prepared in this way occurs in the form of a violet precipitate, consisting of particles having a mean diameter by mass of 28 microns.

Preparation of the Prepolymer

Into a 5 liter stainless steel reactor, provided with a stirrer system rotating at 750 revolutions per minute, there are introduced under nitrogen 3 liters of n-hexane heated to 50° C., 28.8 milliliters of a molar solution of diethylaluminium chloride (DEAC) in n-hexane and a quantity of catalyst (F) containing 9.6 milligram atoms of titanium. There is then introduced a volume of 30 ml of hydrogen measured under normal conditions, the propylene at a throughput of 160 g/hr for 3 hours. At the end of this time the prepolymer suspension is maintained with stirring for a further half hour. It is cooled to ambient temperature (20° C.) and the reactor is degassed. Then under nitrogen the prepolymer powder is washed 3 times with n-hexane. The prepolymer suspension in n-hexane is then decanted into a rotary evaporator under a vacuum. In this way 480 g are obtained of a prepolymer powder (G) containing 0.02 milligram atoms of titanium per gram.

Start up of Copolymerisation in a Fluidised Bed

A fluidised bed type reactor in stainless steel, with a diameter of 90 cm, previously kept under an atmosphere of nitrogen, is subjected to a purge consisting in successive operations of pressurising the reactor at 1.8 MPa with nitrogen at 90° C., followed by degassing to atmospheric pressure, these operations being repeated 4 times, the nitrogen employed having a water content of less than 0.3 vpm. Thereafter, a continuous stream of nitrogen at 90° C. is passed into the reactor, until the water content of the atmosphere in the reactor is reduced to 10 vpm. There are then introduced into the reactor under an atmosphere of nitrogen as charge powder, 70 kg of a copolymer powder of propylene and 1-butene, having a bulk density of 0.4 g/cm$^3$, a titanium content of 50 ppm, a content by eight of units derived from 1-butene of 29% and a melt index (MI$_5$) equal to 6 g/10 minutes. This powder consists of solid particles having a mean diameter by mass of 300 microns. The reactor containing the copolymer powder is subjected to dehydration with nitrogen at 55° C., until the water content of the atmosphere in the reactor is reduced to a value of 3 vpm. There is then introduced into the reactor a gaseous mixture consisting of hydrogen, propylene, 1-butene and nitrogen propelled at a rising speed of 45 cm/sec, at a temperature of 55° C. The partial pressures (pp) of the 4 constituents of this gaseous mixture are as follows:

pp hydrogen = 0.02 MPa
pp propylene = 0.70 MPa
pp 1-butene = 0.28 MPa
pp nitrogen = 1.00 MPa.

There is then introduced into the reactor 0.1 liter of a molar solution of TnOA in n-hexane and 0.6 liter of a molar solution of DEAC in n-hexane, and the reactor is maintained in this way under these conditions for 1 hour. Then there is introduced into this reactor in sequence at the rate of 1 injection of 25 g every 3 minutes the prepolymer (G) prepared previously.

At the end of approximately 1 hour after the commencement of introduction of the prepolymer, there is continuously introduced, direct into the reactor, a mixture of TnOA and of DEAC, in a 0.1 molar solution of TnOA and 0.9 molar solution of DEAC in n-hexane, at a throughput corresponding to 30 milligram atoms of aluminium per hour.

It is found that the copolymerisation reaction starts up as soon as the prepolymer is introduced into the reactor, and that during the first 24 hours of the reaction the titanium content of the copolymer powder making up the fluidised bed never exceeds 50 ppm, the content by weight of units derived from 1-butene and a melt index (MI$_5$) of this copolymer remaining more or less constant and equal to 29% and 6 g/10 minutes respectively. Furthermore, no formation of copolymer agglomerates is observed in the reactor during the start up of this reaction.

We claim:

1. Process for the gas phase polymerization or copolymerization of ethylene or propylene by bringing the said ethylene or propylene into contact with a catalytic system of the Ziegler-Natta type under polymerization or copolymerization conditions in a reactor in which the polymer or the copolymer is maintained in a fluidised bed and/or is agitated with mechanical stirring, said reactor containing a charge powder, the catalytic system of the Ziegler-Natta type consisting of a catalyst of the general formula $$Mg_mMe_nM(OR_1)_p(R_2)_qX_r$$

in which Mg is a magnesium, Me is aluminum and/or zinc, M is titanium and/or vanadium, R$_1$ is an alkyl group comprising from 2 to 14 carbon atoms, R$_2$ is an alkyl group comprising from 2 to 12 carbon atoms, X is chlorine, where:

m is comprised between 0.5 and 50,
n is comprised between 0 and 1,
p is comprised between 0 and 3,
q is comprised between 0 and 1,
r is comprised between 2 and 104, and of an organoaluminum or organozinc compound as a co-catalyst, the process comprising a start up operation with the charge power, and being characterised in that, the catalytic system is in the form of a prepolymer or fixed on an inorganic granular support and previously to the introduction of the catalytic system in the reactor, the charge powder is dehydrated by bringing the powder into contact with an atmosphere of inert gas, alpha-olefins, hydrogen or a mixture containing at least two of these gases, in such conditions that after dehydration, the water content of this atmosphere is equal to or less than 6 vpm and thereafter subjected to a treatment for at least five minutes by bringing the said charge powder into contact with at least one organoaluminum compound of the formula $$AlT_nX_{3-n}$$

in which R is an alkyl group comprising from 2 to 12 carbon atoms, X is a hydrogen or halogen atom, or an alcoholate group, and n is a whole number or fraction comprised between 1 and 3, the quantity of organoaluminum compound employed being comprised from 1 to 20 millimoles per kilogram of charge powder, whereby the (co)polymerization reaction starts up as soon as the catalytic system is introduced into the reactor, without observable formation of (co)polymer agglomerates.

2. Process according to claim 1, characterised in that the charge powder is dehydrated by bringing the powder into contact with an atmosphere of inert gas, having a water content less than 3 vpm.

3. Process according to claim 1, characterised in that the treatment of the charge powder with the organoaluminum compound or compounds is performed under an atmosphere consisting of inert gas, alpha-olefins, hydrogen or a mixture containing at least two of these gases.

4. Process according to claim 1, characterised in that the treatment of the charge powder with the organoaluminum compound or compounds is performed under a pressure at least equal to atmospheric pressure and at a temperature comprised between 0° and 120° C.

5. Process according to claim 1, characterised in that the charge powder is polyolefin powder.

6. Process according to claim 1, characterised in that the charge powder consists of particles having a mean diameter by mass comprised between 50 and 5000 microns.

7. Process according to claim 1, characterised in that the organoaluminum compound used in the treatment of the charge powder is a trialkylaluminium chosen from amongst triethylaluminum, triisobutylaluminum, tri-n-hexylaluminum or tri-n-octylaluminum.

8. Process according to claim 1, characterised in that the contacting of ethylene or propylene with the charge powder is effected in the presence of a quantity of catalyst system to 10 times greater than the minimum quantity necessary to guarantee the desired polymerization or copolymerization in stable production, for a period corresponding to the production of a quantity by weight of polyolefin comprised between 1 and 6 times the quantity by weight of charge powder used.

9. Process according to claim 1, characterised in that the catalyst system is a prepolymer obtained by contacting the catalyst and co-catalyst with one or more alpha-olefins, in quantities such that the prepolymer contains between 0.002 and 10 milligram atoms of transition metal per gram, or in the form of a catalytic system fixed on an inorganic granular support and containing from 0.03 to 0.5 milligram atoms of transition metal per gram, said prepolymer or catalytic system fixed on an inorganic granular support, containing quantities of catalyst and co-catalyst such that the atomic ratio of the quantity of metal in the co-catalyst to the quantity of transition metal in the catalyst is comprised between 0.1 and 60.

10. Process according to claim 1, characterised in that the gas phase (co-)polymerization is performed by contacting ethylene or propylene with the catalytic system in the presence of an additional quantity of co-catalyst comprised between 0.01 and 10 millimoles per kilogram of polyolefin produced when the weight of polyolefin produced is equal to or greater than 0.1 times the weight of the charge powder employed, this co-catalyst being of a nature identical to or different from that of the co-catalyst which is a constituent of the catalytic system.

11. Process according to claim 4, characterised in that the treatment of the charge powder with the organoaluminum compound or compounds is performed under pressure comprised between 0.1 and 5 MPa.

12. Process according to claim 9, characterised in that said prepolymer or catalytic system fixed on an inorganic granular support contains quantities of catalyst and co-catalyst such that the atomic ratio of the quantity of metal in the co-catalyst to the quantity of transition metal in the catalyst is comprised between 0.5 and 10.

13. Process according to claim 10, characterised in that the weight of polyolefin produced is equal to or greater than 0.3 times the weight of the charge powder employed.

* * * * *

UNITED STATES PATENT AND TRADEMARK OFFICE
CERTIFICATE OF CORRECTION

PATENT NO. : 5,077,358     Page 1 of 2

DATED : December 31, 1991

INVENTOR(S) : DANIEL C. DURAND et al

It is certified that error appears in the above-identified patent and that said Letters Patent is hereby corrected as shown below:

Col. 4, l. 55, after "between" strike "and", change "2.5" first occurrence,, to --1.5--.

Col. 5, l. 8, correct the spelling of the word "above".

Col. 5, l. 28, space between the word "organomagnesium" and the and "or".

Col. 8, l. 38, correct the spelling of the word "compound"

Col. 9, l. 8, correct the spelling of the word "organoaluminium"

Col. 12, l. 35, correct the spelling of the word "powder"

Col. 14, l. 64 , change "condition" to --conditions--

Col. 15, l. 29, correct the spelling of the word "separately"

Col. 18, l. 51, after "into the" change "reaction" to --reactor--

Col. 21, l. 52, change "be" to --by--

Col. 22, l. 65, after "conditions" change the period (.) to a comma (,), and change "the" to --then--

UNITED STATES PATENT AND TRADEMARK OFFICE
CERTIFICATE OF CORRECTION

PATENT NO. : 5,077,358

DATED : December 31, 1991

INVENTOR(S) : Daniel C. Durand, et. al.

It is certified that error appears in the above-identified patent and that said Letters Patent is hereby corrected as shown below:

Col. 23, line 24, change "eight" to --weight--.

Signed and Sealed this

Twenty-fifth Day of May, 1993

Attest:

MICHAEL K. KIRK

*Attesting Officer*   Acting Commissioner of Patents and Trademarks